Patented July 10, 1928.

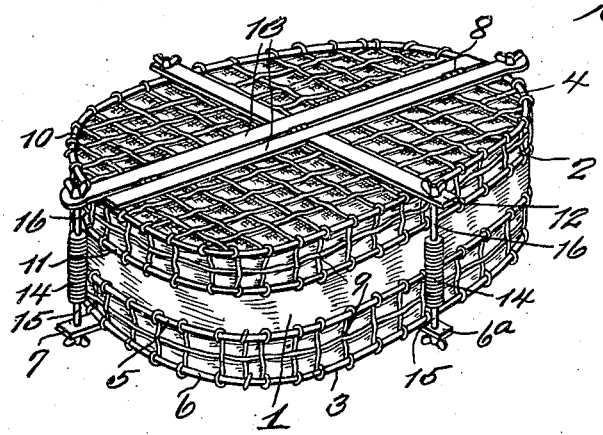
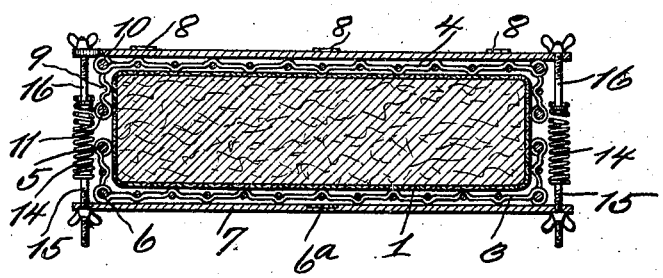
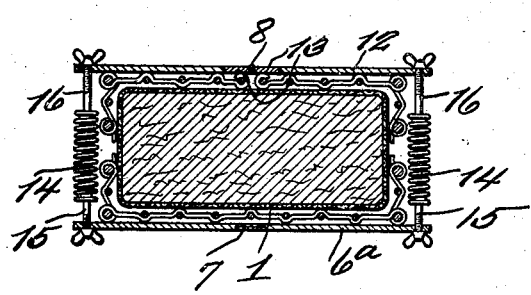

1,676,816

UNITED STATES PATENT OFFICE.

FREDERICK BRIGGS, OF WASHINGTON, DISTRICT OF COLUMBIA, ASSIGNOR TO BRIGGS PACKING CO., OF WASHINGTON, DISTRICT OF COLUMBIA, A CORPORATION OF DELAWARE.

OPENWORK CONTAINER FOR TREATING MEATS.

Application filed January 2, 1925. Serial No. 182.

The present invention has for its purpose the provision of an open-work container for use in connection with processes for treating ground meats with ground curing properties therein, such as disclosed in the three co-pending applications filed the 17th day of March, 1924, and the second day of January, 1925, Serial Nos. 699,612; 183 and 184.

Another purpose is to provide an open-work container comprising two sections with marginal flanges, in conjunction with means for exerting the pressure of one section toward the other and vice versa, said means being of such a character as to regulate the pressure.

Still another purpose is the provision of means to permit the open-work container to easily and readily receive the ground meat, that is, within a fabric container, and in use it is the aim to regulate the pressure between the two sections with such precision as to prevent the escape of the juices and flavor and yet cause just the proper amount of evaporation.

Another purpose is to provide an open-work container similar to that shown in the co-pending application for process for producing dried beef from a solid portion thereof, filed March 17, 1924, Serial No. 699,612.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in perspective of the improved open-work container constructed in accordance with the invention.

Figure 2 is a sectional view longitudinally through the same on line 2—2 of Figure 1, showing the fabric container therein with meat within the fabric container, either in bulk or ground.

Figure 3 is a transverse sectional view on line 3—3 of Figure 1.

Figure 4:
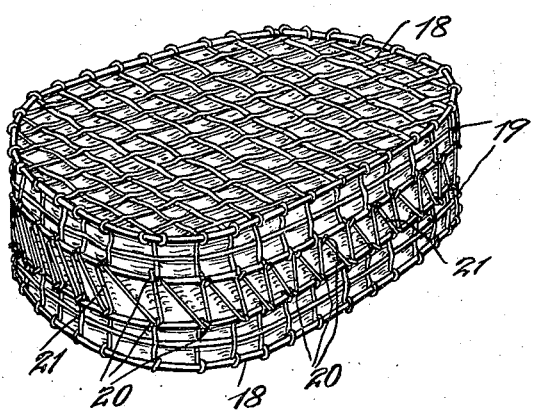
Figure 4 is a view of a modified form of open-work container which is similar to that shown in the co-pending application, Serial No. 699,612.
Figure 5:
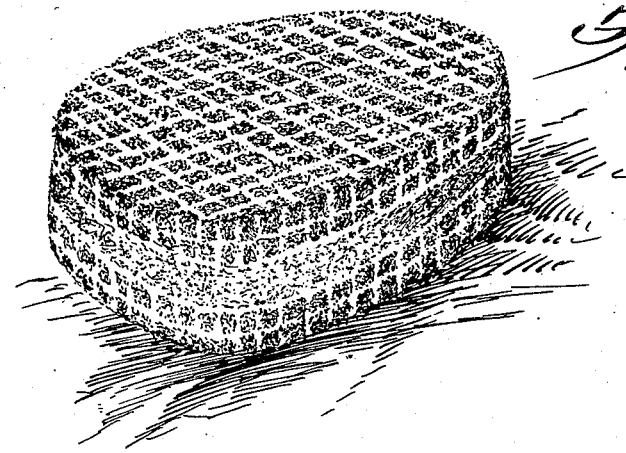
Figure 5 is a detail perspective view of a piece of dried beef as may be made or formed by the open-work container.

Referring to the drawings, 1 designates a fabric container which may be filled with solid or ground meat. This fabric container is open at one end to permit the insertion of the meat, and when housed in the open-work container 2, the required pressure may be exerted. The open-work container comprises two sections 3 and 4. The section 3 has a marginal flange 5 and stiffening or reinforcing wires 6, and its bottom has intersecting cross bars 6ª and 7, the terminals of which afford means whereby the section 3 may be detachably connected to the section 4.

The section 4 in general is similar in construction to the section 3, with the exception that it consists of two parts hingedly connected, as at 8. In fact, the section 4 has a marginal flange 9 and the reinforcing or stiffening wires 10 and 11. The bottom of the section 4 has intersecting cross bars 12 and 13.

Suitable tensioning springs 14 are provided, certain ends of which have connectors 15 connecting with the terminals of the bars 6 and 7. The other ends of the springs have swivelly or otherwise anchored thereto screw rods or connectors 16 which have their threaded ends passed through the terminals of the bars 12 and 13, there being wing nuts upon the threaded ends of the rods or connectors 16. Obviously, by adjusting the wing nuts, it is possible to increase or decrease the tension of the springs, and by this method it may be seen that the two sections of the open-work container may be exerted toward and from each other. By this construction, it is possible to exert continuous pressure upon the fabric container and its contents in order to produce the best results in the processes belonging to the applications above mentioned.

In Figure 4, there is disclosed a modified form of open-work container which consists of opposed sections 18 which are similar in shape, made up of any suitable relatively heavy wire fabric or meshwork. The sections are similar to those in Figures 1, 2 and 3 and also have flanges 19 which are provided with lateral projections 20. A suitable lacing 21 is provided which, when the sections are placed as shown in Figure 4, is laced from the projections of one section to those of the other section, acting to draw the two sections together to cause pressure on the contents, such as ground meat within the cotton bag which, with its contents, is positioned between the two sections.

In all processes heretofore produced for curing meat, it is necessary to subject the meat to substantial pressure to insure removal of the moisture, the meat having been previously soaked in water or a brine solution. The present container is used in connection with the processes of the co-pending applications above named, known as the only dry processes, due to the fact that the meat is not first soaked in water or a brine solution, requiring the meat to be subjected to pressure to remove water or brine solution, prior to proceeding with the subsequent curing dry process steps. Prior to the processes called for in the co-pending applications above named, it has been essential to use substantial quantities of saltpetre, salt and sugar. However, in the processes wherein this container is used, it has been found practical to use fifty ounces of salt and forty ounces of sugar to every hundred pounds of ground meat, with just enough saltpetre to give the meat a suitable coloring, say for instance two ounces. The quantities of curing ingredients as herein specified produce a preservative as good, if not better, than preservatives heretofore used.

Either construction of open-work container may be suspended in any suitable manner in cold storage or in drying rooms. However, it is preferable to suspend the open-work containers in a horizontal position so as to insure a better curing of the meat. This is particularly so in smoking as the smoke has a tendency to penetrate the meat where it is placed horizontally, much better than should the meat be suspended vertically. In the old way of smoking beef to produce what is known as dried beef or chipped beef, the meat is always hung from the smaller end of the meat, consequently the meat sags and causes the larger end at the bottom of the meat, and as the smoke passes up, it passes over the surface of the meat and does not reach the interior of the meat as readily as if the meat is disposed horizontally as may be accomplished by the present form of open-work container.

The invention having been set forth, what is claimed is:

An open-work container for use in connection with meat treating processes consisting of opposed open-work sections, said sections having marginal flanges, said sections having reinforcing intersecting cross bars, one section being constructed in two parts hingedly united to facilitate the insertion of the contents in the container, contracting springs connected to the terminals of the cross bars of one section, and adjustable means connecting the other ends of the springs to the terminals of the cross bars of the other section, thereby creating constantly increasing tension between the two sections and exerting pressure upon the contents of the container.

In witness whereof, the inventor's signature is hereunto affixed.

FREDERICK BRIGGS.